United States Patent [19]

Imataki et al.

[11] Patent Number: 4,783,155
[45] Date of Patent: * Nov. 8, 1988

[54] OPTICAL DEVICE WITH VARIABLY SHAPED OPTICAL SURFACE AND A METHOD FOR VARYING THE FOCAL LENGTH

[75] Inventors: Hiroyuki Imataki, Kawasaki; Takashi Serizawa, Yokohama; Masayuki Usui, Yokohama; Takeshi Baba, Yokohama; Hiroyasu Nose, Tokyo, all of Japan

[73] Assignee: Canon Kabushiki Kaisha, Tokyo, Japan

[*] Notice: The portion of the term of this patent subsequent to Nov. 1, 2005 has been disclaimed.

[21] Appl. No.: 606,538

[22] Filed: May 3, 1984

[30] Foreign Application Priority Data

| Oct. 17, 1983 | [JP] | Japan | 58-193868 |
| Nov. 21, 1983 | [JP] | Japan | 58-219113 |
| Nov. 25, 1983 | [JP] | Japan | 58-222607 |
| Nov. 25, 1983 | [JP] | Japan | 58-222608 |
| Nov. 25, 1983 | [JP] | Japan | 58-222610 |
| Dec. 2, 1983 | [JP] | Japan | 58-228693 |
| Dec. 2, 1983 | [JP] | Japan | 58-228695 |
| Jan. 26, 1984 | [JP] | Japan | 59-12489 |

[51] Int. Cl.$^4$ .......................... G02B 15/00; G02B 1/06
[52] U.S. Cl. ...................................... 350/423; 350/409; 350/419
[58] Field of Search ................. 350/423, 409, 418, 419

[56] References Cited

U.S. PATENT DOCUMENTS

| 4,097,126 | 6/1978 | Mahlain et al. | 350/164 X |
| 4,289,379 | 9/1981 | Michelet | 350/419 |
| 4,303,324 | 12/1981 | Marcus | 350/255 X |
| 4,444,471 | 4/1984 | Ford, Jr. et al. | 350/423 |
| 4,514,048 | 5/1985 | Rogers | 350/423 |

OTHER PUBLICATIONS

Caudell et al., "Active Optics with RTV Silicone Rubber", *SPIE*, vol. 115, Advances in Replicated & Plastic Optics, pp. 18-24.

*Primary Examiner*—John K. Corbin
*Assistant Examiner*—Scott J. Sugarman
*Attorney, Agent, or Firm*—Fitzpatrick, Cella, Harper & Scinto

[57] ABSTRACT

An optical device having a variable optical surface is given by the combination of an elastic body and a relatively rigid member having an opening and disposed to contact the elastic body to expose a part of the surface of the elastic body. The exposed surface part forms a variable optical surface, the shape of which is changed by deforming the elastic body to vary the focal length.

27 Claims, 6 Drawing Sheets

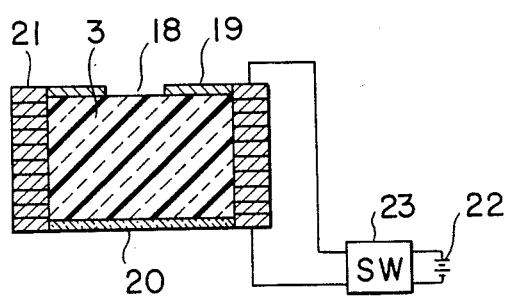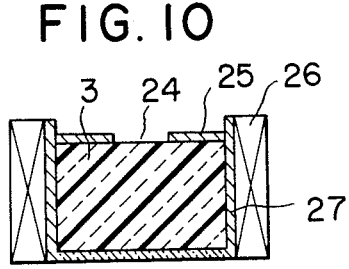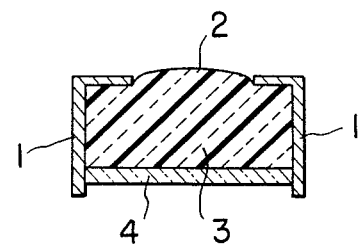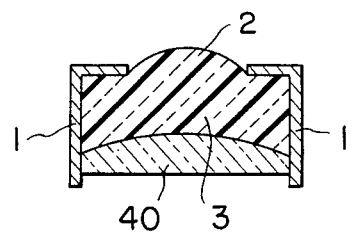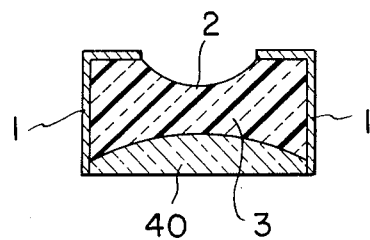

OPTICAL DEVICE WITH VARIABLY SHAPED OPTICAL SURFACE AND A METHOD FOR VARYING THE FOCAL LENGTH

BACKGROUND OF THE INVENTION

1. Field of the Invention

This invention relates to an optical device which is used for optical instruments such as cameras and video instruments, electrooptics instruments including those for optical communication and laser disc, and particularly to an optical device capable of varying the focal length by changing the shape of an optical surface and also to a method of varying the focal length by use of such a variable-focus optical device.

2. Description of the Prior Art

Heretofore, as variable-focus or variable-focal-length lenses, a container of an elastic body filled with liquid which is changed in shape by its liquid pressure, as disclosed in Japanese Laid-open Patent Application No. 36857/1980, and a lens with the use of a piezoelectric member, as disclosed in Japanese Laid-open Patent Publication Nos. 110403/1981 and 85415/1983, have been proposed.

However, the so-called liquid lens of the former one additionally requires a liquid reservoir and a pressurizing means, which pose a difficulty in making a device compact, while the latter has the drawback that the variable range cannot be so great.

SUMMARY OF THE INVENTION

An object of the present invention is to provide a variable focus lens which can overcome the drawbacks as mentioned above, can provide a large amount of variation in focal length and is simple in structure.

Another object of the present invention is to provide an optical device, in which variation of the focal length can easily be performed.

Still another object of the present invention is to provide an optical device which can control the shape of an optical surface.

Still another object of the present invention is to provide an optical device having a reflective optical surface with variable focal length.

A further object of the present invention is to provide a very small optical device with variable focal length.

Still another object of the present invention is to provide a method of varying a focal length which can be operated easily and with a wide range of variation in focal length.

The above objects can be accomplished by an optical device, comprising an elastic body and a relatively rigid member having an opening and contacting the elastic body to expose a part of the elastic body through the opening, the surface of the exposed part of the elastic body being changeable in shape through deformation of the elastic body to form a variable optical surface.

These and other objects and features of the present invention will be more readily apparent in view of the following detailed description when read in conjunction with the accompanying drawings.

BRIEF DESCRIPTION OF THE DRAWINGS

FIG. 9 and FIG. 10 each is a sectional view of another embodiment of the optical device according to the present invention provided with a means for applying an external force;

FIG. 11 is a sectional view of another embodiment of the optical device according to the present invention having a larger opening diameter;

FIGS. 12 through 19 each is a sectional view of another embodiment of the optical device according to the present invention, which is provided with a member having a convex or concave inner side face contacting the elastic body;

DETAILED DESCRIPTION OF THE INVENTION

Figure 1:
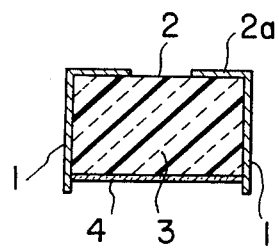
FIG. 1, FIG. 2 and FIG. 3 are sectional views showing different states of an embodiment of the optical device according to the present invention, FIG. 1 showing the state without application of an external force, FIG. 2 a state when an external force is applied upwardly and FIG. 3 a state when an external force applied downwardly.

The optical device according to the present invention comprises an elastic body and a relatively rigid member having an opening and contacting the elastic body to leave a part of the elastic body exposed or uncovered through the opening. The exposed, uncovered or free surface of the elastic body can change its shape through deformation of the elastic body. More specifically, according to the optical device of the present invention, by permitting the exposed surface of the elastic body itself to protrude to form a convexity, to be recessed to form a concavity or to change the degree of such a convexity or concavity already formed at the opening, thereby to deform the exposed optical surface formed by the elastic body at the opening portion, whereby desired optical characteristics, for example, focal length, can be obtained. Accordingly, by only applying an external force on the elastic body or by only changing the volume of the elastic body, the optical surface can be reversibly changed to give desired optical characteristics. Therefore, the optical device can be constructed and controlled very easily, and a large degree of variation of the optical characteristics can be attained, because the changes in optical characteristics are based on the changes in shape of the optical surface.

As an elastic body to be used in the present invention, there may be employed any material having a property (elasticity) of being able to undergo change on application of a force on a body or mass of the material and be restored to the original form from deformation on removal of the force, provided that the force applied is not too large (within the elastic limit).

In an ordinary solid, the maximum strain within its elastic limit (critical strain) is about 1%. In a vulcanized elastic rubber, the elastic limit is very great and the critical strain amounts to approximately 1000%.

In the optical device according to the present invention, a material having a modulus of elasticity corresponding to the characteristics of the optical device to be formed may be used as desired, but it is preferred to use a material with a small elasticity modulus, in order to readily obtain greater elastic deformation or to make the state after deformation optically more uniform.

The elasticity modulus (G) is represented by $G = \sigma/\gamma$ (where $\sigma$ =stress, and $\gamma$ =elastic strain). Also, the elasticity capable of giving a great deformation with a small stress is referred to as having high elasticity or rubber-(ey) elasticity, and therefore this kind of elastic body in particularly preferable in the present invention.

Such rubbery elastomers may include those generally known as "rubbers", namely natural rubber and synthetic rubbers such as styrene-butadiene rubber (SBR), butadiene rubber (BR), isoprene rubber (IR), ethylene-propylene rubber (EPM, EPDM), butyl rubber (IIR), chloroprene rubber (CR), acrylonitrile-butadiene rubber (NBR), urethane rubber (U), silicone rubber (Si), fluorine rubber (EPM), polysulfide rubber (T), polyether rubber (POR, CHR, CHC) and the like. All of these are rubbery at room temperature. However, polymeric substances can be glassy, rubbery or molten, depending on the of the Brownian movement of the molecules. Accordingly, polymeric substance exhibiting a rubbery state at the temperature at which the optical device is used may be employed widely as an elastic body in the present invention. The elasticity modulus in the rubbery state is determined primarily by the cross-linked state of the polymeric chains constituting the elastomer. Thus, for example, vulcanization of natural rubber is nothing but a treatment which determines its modulus.

As an elastic body to be used in the present invention, it is desirable to use an elastomer which can give a great deformation with a small force, and, for this purpose, it is important to control the degree of crosslinking.

However, a reduction in elasticity modulus (tendency to exhibit greater deformation with smaller stress) on the other hand, will bring about a lowering in strength on the and therefore it is necessary to select adequately an elastomer to be employed so that the optical device to be formed can maintain its strength suited for the purpose. Also, measurement of elasticity modulus is conducted depending on the kind of the stress exerted according to the operation mode of the optical device used, for example, according to a method of measurement by applying tensile, flexural or compression stress.

The elastic body to be used in the present invention should have an elasticity modulus smaller than the elasticity modulus of an ordinary solid of $10^{11}$ to $10^{13}$ dyne/cm$^2$, appropriately $10^8$ dyne/cm$^2$ which is the level of ordinary rubbery elastomer or lower, preferably $10^6$ dyne/cm$^2$ or lower, particularly preferably $10^5$ dyne/cm$^2$ or lower. The lower limit should preferably be as small as possible, provided that the elastic body has a property of not being spilled, as different from liquids in general, in other words, a shape-retaining property. In most cases, optical devices are used at room temperature, but sometimes they may be used at higher or lower temperature. Accordingly, the range of elasticity modulus as specified above represents the value at the temperature at which the optical device is employed.

Hardness or softness of an elastic body depends to some extent on its elasticity. In Japanese Industrial Standards (JIS) K 6301, there is defined a method in which hardness of a rubber sample is simply evaluated by penetration when a minute strain is given to the sample surface by a spring.

However, if the value of elasticity modulus is as low as $10^6$/cm$^2$ or lower, measurement according to the above method becomes impossible. In such a case, penetration is measured and evaluated by means of a ¼ inch microconsistometer according to JIS K 2808.

Also, when the elasticity modulus is small, it is difficult to measure the modulus by the "tensile-elongation" relationships, and its value can be determined by compression (5% deformation). The value can be correlated to the aforesaid penetration.

Rubber elastomers include, in addition to vulcanized (crosslinked) rubbers conventionally known in the art, ethylene-vinyl acetate copolymers, butadiene-styrene block copolymers for which no vulcanization is required or those obtained by appropriately gelling of chain polymers (i.e. controlling the molecular chain lengths between the cross-linking points).

Elasticity modulus of any of these elastomers is controlled by controlling the degree of cross-linking, the combination of monomers in block copolymers or the state of gelling.

In addition to controlling the elasticity by the structure of the elastic material itself, it is also possible to vary its characteristics by adding a diluent or a filler thereto.

For example, when a diluent (trade name: RTV thinner, produced by Shinetsu Kagaku Kogyo K.K.) is added to a silicone rubber (trade name: KE 104, produced by Shinetsu Kagaku Kogyo K.K.) and a catalyst (trade name: CAT-104, produced by Shinetsu Kagaku Kogyo K.K.), hardness and tensile strength are lowered as the amount of addition increases, while elongation is contrariwise increased.

The optical device of the present invention may be of either a transmission type or a reflection type. When it is made as a transmission type, the elastic body should preferably have a transmittance of above 80%, more preferably 95% or above when measured at a thickness of 1.0 cm by using a parallel plate transmission meter.

As a method for deforming the optical surface of the elastic body at the exposed or open portion, other than by external force, it is also possible to utilize the volume change accompanying the thermal expansion or shrinkage or sol-gel change with the use of the above material.

The member having an opening for forming an optical surface of an elastic body may be a flat plate provided with an opening, or alternatively, or otherwise, a casing provided with an opening on at least one wall thereof, in which the elastic body may be confined. This opening may be formed in a variable form depending on the optical effect required, but generally in a circular form to give a convex or concave lens with variable focal length.

Also, by providing a rectangular slit-shaped opening, it is possible to have a cylindrical lens or a toric lens.

The optical device formed by these openings or, more correctly, the exposed surface of the elastic body at each of these opening can be freely changed in its shape by external force applied on the elastic body or the volume change of the elastic body, and the degree of change can be controlled while detecting its effect with feedback.

The opening can be provided by a piezo-electric element such as a cylindrically formed piezo-electric material, whereby the device can be formed in a remarkably compact form. The cylinder of a piezoelectric material can apply an external force to the elastic body while changing its diameter or its height according to appropriate selection of the piezoelectric material.

The member having an opening can change its shape to some extent as far as the opening retains a similar figure when the elastic body is deformed. However, it is most preferable that the opening member be substantially rigid and does not substantially change the shape of the opening because the following advantages are obtained thereby. Thus, when the opening is circular, a rotationally symmetrical optical surface, which is optically desirable, is readily attained. (In this respect, the deformation of the opening is tolerable as far as the similarly in figure of the opening is retained.) The amount, of light transmitting through the opening does not substantially change. There are avoided other ill effects to the optical surface accompanying the change in shape of the opening.

As a means for applying external force on the elastic body, any methods known in the art may be available, but it is desirable to perform deformation of the elastic body according to the feedback mechanism while detecting its optical effect. For this purpose, it is preferred to employ a method in which electrical control can be performed by means of, for example, an electromagnet, stepping motor or piezoelectric device. Also, volume change by heating may be effected by means of a heater provided outside or inside of the elastic body.

Next, typical embodiments of the optical device of the present invention are to be described in detail, while referring to the accompanying drawings.

Figure 2:
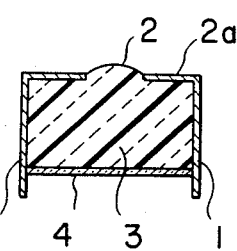
Figure 3:
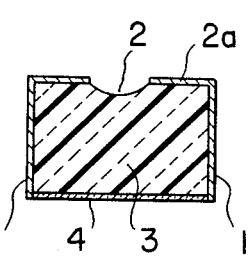

FIG. 1 to FIG. 3 show sectional views respectively showing different states of an embodiment of the optical device of the present invention, which is provided with a member 1 having an opening 2 and a movable member 4 on the opposing sides with an elastic body 3 sandwiched therebetween. In these Figures, a cylindrical casing or vessel 1 having a circular opening 2, and the elastic body 3 is transparent to at least the light with the wavelength used. A movable member 4 is provided for pressurizing the elastic body 3 and composed of a transparent flat plate which is disposed in parallel with the upper portion 2a surrounding the opening 2 of the casing 1. FIG. 1 shows a state where no pressure is applied.

FIG. 2 shows a state where a pressure is applied on the elastic body 3 through the movable member 4, and a part of the elastic body exposed through the opening is protruded to form a convex lens corresponding to the magnitude of the pressure applied. FIG. 3 shows a state where a negative pressure is applied on the elastic body 3 through the movable member 4, and the elastic body is recessed to form a convex lens at the opening portion. In order to realize this state, the elastic body 3 should be attached to the inner-surface of the upper member 2a, e.g. with an appropriate adhesive.

Thus, depending on the magnitude of the external force applied on the movable portion or member of the casing, a desired optical surface shape can be realized with a part of the elastic body at the opening portion.

The plate 2a having the opening 2 is desired to be opaque. However, when it is transparent, the device can be utilized as an optical device having double focuses. The movable member may be attached to the elastic body with an adhesive, etc., if desired. Also, if necessary, the elastic body may be attached wholly to the inner surface of the casing.

Figure 4:
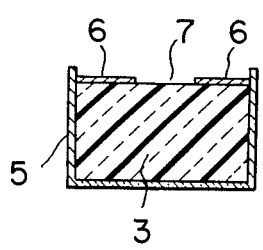
FIGS. 4, 5, 6 and 7 each is a sectional view of another embodiment of the optical device according to the present invention.

FIG. 4 shows another embodiment of the optical device according to the present invention, wherein the member having an opening is movable. Thus, it is also possible to pressurize the elastic body 3 placed in a casing 5 having an optically transparent flat plate at the bottom by a movable member 6 having a circular opening 7.

Figure 5:
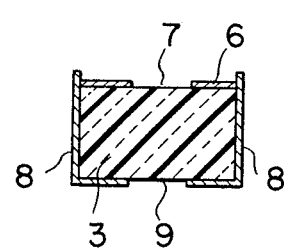
Figure 6:
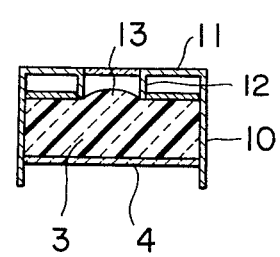

FIG. 5 shows still another embodiment of the optical device according to the present invention, which is provided with a member 6 having an opening 7 capable of giving an optical surface through protrusion or recession of the elastic body on the side opposed to another member having an opening 9 with the elastic body sandwiched therebetween. By provision of plural openings 7 and 9, respective curvatures can be given by application of a pressure. Also, by changing the sizes of the plural openings, different curvatures can be given, respectively. Further, as shown in FIG. 6, the elastic body 3 may be housed in a casing 10, wherein an opening 13 is formed inside the casing. The opening 13 is formed by a hollow cylinder 12 fixed on an optically transparent upper lid 11 of the casing, and an optical surface with the elastic body is formed at the opening 13 by application of an external force on a movable member 4.

Here, as the method for applying a pressure on the elastic body by driving the movable portion 4 or 6 explained with reference to the above examples, any kind of method may be available. As a simple method, the casing may be treated and the movable member may be screwed thereinto or alternatively the movable member may be driven under control of an electromagnet, but the present invention is not limited by those methods.

Figure 7:
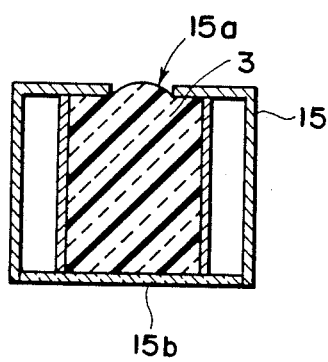

FIG. 7 shows another embodiment of the optical device according to the present invention, which is provided with a movable member 14 contacting the elastic body 3 at the face virtually perpendicular to the face on which the opening exists. More specifically, an optical surface can be formed by use of a cylindrical piezoelectric element 14 and, through expansion and shrinkage thereof in the radius direction, the elastic body 3 can be protruded or recessed from the opening 15a of the cylindrical casing 15, which has a transparent bottom plate 15b.

Figure 8:
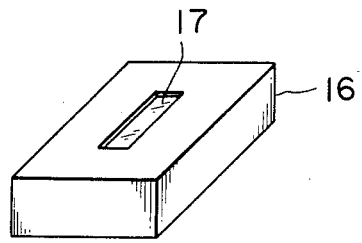
FIG. 8 is a perspective view of still another embodiment of the optical device according to the present invention.

The opening of the optical device according to the present invention is not limited to a circular shape. For example, as shown in FIG. 8, by use of a casing 16 having a rectangular opening 17, the shape of the elastic body protruded or recessed by pressurization can be made a cylindrical or a toric shape.

FIG. 9 and FIG. 10 illustrate examples of the optical device provided with means for applying external force. In FIG. 9, the elastic body 3 is encased in a cylinder 21 composed of stacked layers of annular piezoelectric elements and, by applying a voltage to the piezoelectric cylinder 21 from a power source 22 via a switch 23, a disc-shaped movable member 20 and a movable member having an opening 18 respectively affixed to the upper and lower inner ends of the piezoelectric cylinder 21 are approached to each other, whereby the optical surface at the opening 18 can be deformed. In this embodiment, each layer of piezoelectric element has a property of changing its thickness when applied with an electric field in the thickness direction. Alternatively, a piezoelectric sheet or film may be used, which has a property of changing its area or length in the direction of extension when applied with an electric field in the thickness direction. On the other hand, in FIG. 10, a movable member 25 comprising a ferromagnetic material is moved by an electromagnet 26 in the depth direction of a casing 27, whereby the optical surface of the elastic body 3 at the opening 24 can be deformed.

In the optical device according to the present invention, as the size of the opening for forming the optical surface increases, there is produced a greater tendency that the shape of the optical surface at the opening becomes greater in radius of curvature in the vicinity of the optical axis, while small near the peripheral portion, resulting in a rotationally symmetrical but non-spherical surface as shown in FIG. 11. The optical surface shape at the opening 2 may vary depending on the thickness or volume of the elastic body and also the elasticity modulus of the elastic body 3. FIG. 12 to FIG. 19 show various embodiments, in which, in order to make the optical surface shapes at the openings spherical or other desired shapes, auxiliary members 40 etc. with convex or concave inner surfaces contacting the elastic body are provided on the sides of the elastic bodies, opposed to the openings, respectively. In the optical devices shown in FIG. 12 to FIG. 19, pressure (and/or tension) is applied on the elastic body by moving a convex or concave member, but it is of course possible to apply pressure (and/or tension) by moving the member having an opening as explained with reference to the embodiments shown in FIG. 9 to FIG. 10.

In FIG. 12, an optical device comprises a cylindrical member 1 having an opening 2, an elastic body 3 and a bottom plate 40 for pressurizing the elastic body 3, of which the face on the side of the elastic body 3 (hereinafter called as the inner side face) is formed in a convex spherical shape. By moving the bottom plate toward the direction for applying pressure on the elastic body, the elastic body 3 will be protruded in convex lens shape from the opening 2. In this case, since the inner side face of the bottom plate 40 is spherical, the central part of the opening portion can be preferentially raised. As a result, as compared with the case when the bottom plate is a flat plate, a more desirable convex spherical face can be obtained. Conversely, as shown in FIG. 13, when the bottom plate is moved so as to apply a negative pressure on the elastic body 3, the elastic body 3 will form a recessed concave lens inside of the opening 2. Also in this case, due to the convex spherical shape of the bottom plate 40, the central part can be preferentially recessed, to give a more desirable concave spherical shape, as compared with the case when the bottom plate 40 is a flat plate.

Also, by varying the shapes of the inner side face of the bottom plate, the optical surface shape formed at the opening 2 can be formed into a desired shape. For example, in FIG. 14, a protruded portion 41a is provided on the inner side face of the bottom plate, and by the same actuation as in the optical device shown in FIG. 12, the central part of the optical surface shape formed at the opening 12 can be made a desired convex or concave shape. By varying the size of the protruded portion 41a, the optical surface shape can be changed variously. Further, since the face 41b of the protruded portion 41a opposed to the opening 2 is flat, if the optical device is used as a transmission type, there is attained an advantage that the optical effect given by a curved surface formed on the inner side face of a transparent bottom plate can be disregarded.

Figure 15:
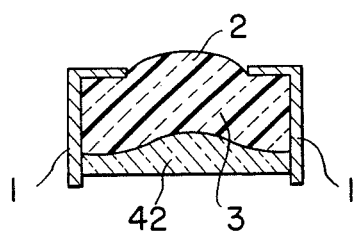

FIG. 15 shows still another embodiment, in which the inner side face of the bottom plate 42 is made a specific free curved face so that the optical surface may be a desired shape. Such a specific free curved face can be determined also by simulation by means of a computer, etc.

Further, the inner side face may be formed by combination of concavity and convexity such as in a sine wave or square wave.

Figure 16:
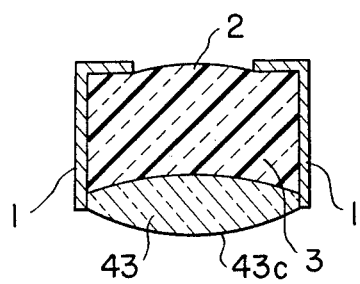

FIG. 16 shows still another embodiment of the invention, in which a face 43c opposite to the inner side face of a bottom plate 43 is curved like a convex lens. In this case, by appropriate selection of refractory index and dispersion of the bottom plate 43, fluctuation in chromatic aberration due to deformation of the elastic body surface at the opening 2 can be reduced.

The above description is similarly applicable to the case when the shape of the opening is in a rectangular slit shape.

Figure 17:
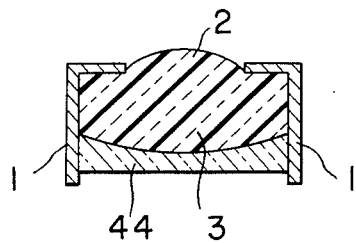
Figure 18:
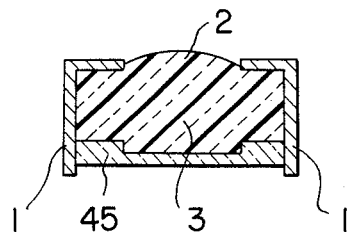
Figure 19:
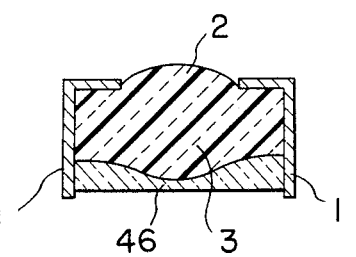

Further, as shown in FIG. 17 to FIG. 19, the inner side faces of the bottom plates 44, 45 and 46 may be formed in concave shapes to give desired shapes to the optical surfaces at the opening 2.

As still another embodiment of the optical device according to the present invention, the area and/or the shape of the opening of the member having an opening can be made variable, whereby the optical surface formed of the elastic body can be controlled. For example, by changing the opening area, the degree of protrusion or recession can be changed to obtain desired optical characteristics. Alternatively, through the change in the contour of the opening, for example, by changing the circular opening into ellipsoidal or rectangular, toric lens or cylindrical lens can be obtained.

As modes for changing the shape of the opening, there may be included those where the area or the contour of the opening is changed and where both the area and the contour are changed. As a method for changing the opening shape, there is a method in which the area of a circular opening is changed by means of a camera iris, and this method is also applicable to a system for changing the ellipsoidal shape. Also, by combining two mechanisms for changing slit widths, the longitudinal and lateral lengths of a rectangular shape can freely be changed.

As still another embodiment of the optical device according to the present invention, there is a structure employing an elastic body of which all or a part of the other surfaces than the surface for forming an optical surface are made into hardened surfaces. By use of such an elastic both with hardened surfaces except for the surface for forming the optical surface, handling of the elastic body can be improved or use of a casing for an elastic body may be rendered unnecessary.

Figure 20:
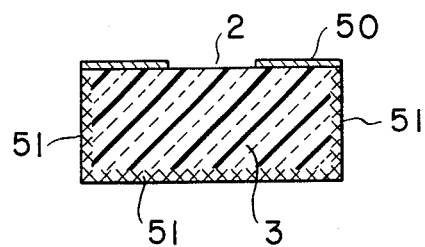
FIG. 20 is a sectional view of another embodiment of the present invention, in which the surface of an elastic body is hardened.
Figure 21:
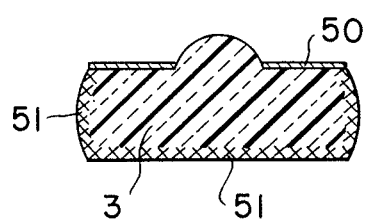
FIG. 21 shows a state when an external force is applied on the optical device shown in FIG. 20.
Figure 22:
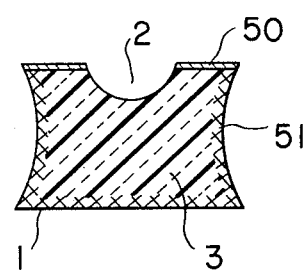
FIG. 22 shows a state when a negative external force is applied on the optical device shown in FIG. 20.

FIG. 20 to FIG. 22 show sectional views of a typical basic structure of such an optical device, which comprises a cylindrical and transparent elastic body 3 having hardened surfaces 51 and a perforated plate 50 having an opening 2 and also functioning as a movable member for pressurization of the elastic body. FIG. 20 shows the state under application of no pressure. FIG. 21 shows a state in which a pressure is applied through the perforated plate 50 on the elastic body 3. In this case, depending on the magnitude of the pressure applied, a part of the elastic body will be protruded in shape of a convex lens. FIG. 22 shows a state wherein a negative pressure is applied through the perforated plate 50 on the elastic body. In this case, the elastic body will be shaped into a concave lens at the opening.

Further, as still another embodiment of the optical device according to the present invention, the surface for forming the optical surface of an elastic body can be made a reflective surface. That is, the optical device can be a mirror with variable focal length by providing such a reflective surface. As a method for forming a reflective surface, there may be employed various methods, including, for example, a method in which aluminum silver or other metals are vapor-deposited on the surface of an elastic body, a method in which metal powder is dispersed, a method in which layers with significantly different refractive indices are successively provided by vapor deposition, spinner coating, plasma polymerization, etc.

Figure 23:
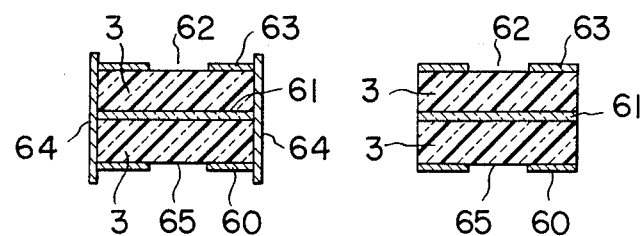
FIG. 23 and FIG. 24 each shows a sectional view of another embodiment of the present invention, which is provided with a member for separating the elastic body.

Still another embodiment of the optical device of the invention comprises a pair of elastic bodies disposed between two members each having an opening and an intermediate or separating member interposed between the elastic bodies. By provision of such a separating member, the shapes of plural optical surfaces can be changed independently or changed simultaneously in a related fashion. In the present invention, a separating member for the elastic body or bodies is provided for particularly realizing independent changes of plural optical surface shapes, and FIG. 23 shows a typical embodiment. The optical device in FIG. 23 comprises an elastic body 3 which is confined in a cylindrical casing 64 as separated by a disc-shaped separating member 61, and at the opposing perforated members 60 and 63 are positioned the opposing openings 65 and 62. The optical surfaces of the elastic bodies formed at the opening portions 65 and 62 can be deformed in any desired shape by moving the perforated members 60 and 63 or 61, or both of the perforated members and the separating member in the direction perpendicular to the openings. For example, by fixing the separating member 61 and moving the perforated members 60 and 63 so as to be approached toward the separating member, the optical surfaces formed at the openings 65 and 62 can be shaped in convexity. On the contrary, by moving the members so as to be apart from the separating member, the optical surfaces can be shaped in concavity. Further, by moving the perforated members 60 and 63 in the same direction, or by fixing the perforated members and moving the separating member 61, one of the optical surfaces formed at the openings 65 or 62 can be shaped in convexity, while the other in concavity.

As a method for applying pressure on the elastic body by driving the perforated member or the separating member, any method may be available. In a simple method, a casing 64 is threaded and a perforated member or a separating member is screwed thereinto or a perforated member or a separating member is driven under control by use of an electromagnet. However, the present invention is not limited by these methods. The separating member 61 is generally an optically transparent member.

Figure 24:
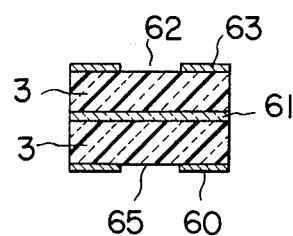

FIG. 24 shows a sectional view of another embodiment of the optical device according to the present invention, in which the elastic body 3 is not contained in a casing. In this case, if desired, the circumferential side surface may be subjected to curing or hardening treatment. Curing treatment may be conducted by dipping the elastic body into a solution having a crosslinking curing agent dissolved therein thereby to effect crosslinking only on its surface or by dipping in a UV-ray-curable resin, followed by curing of the resin by irradiation of a UV-ray.

As still another embodiment of the optical device according to the present invention, by providing a medium which can be deformed in correspondence to the deformation on the optical surface formed by protrusion or recession at the opening of the elastic body, and making reflective the surface of this medium contacting the elastic body, a mirror with variable focal length can be prepared.

Figure 25:
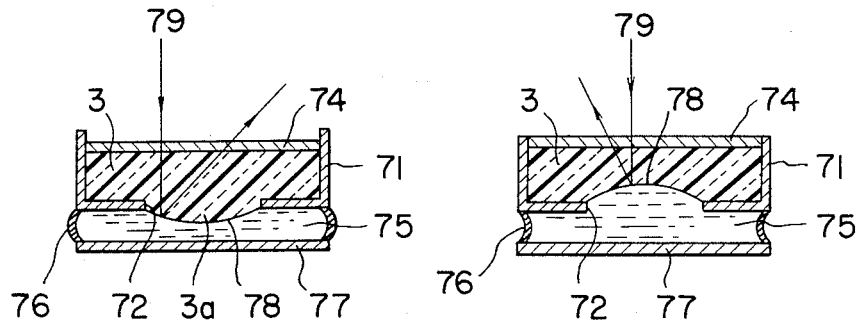
FIG. 25 and FIG. 26 each is a sectional view of another embodiment of the present invention, in which the elastic body contacts a medium having a reflective surface to give a reflective optical surface, FIG. 25 showing a state when applying a positive external force and FIG. 26 a state when applying a negative external force.
Figure 26:
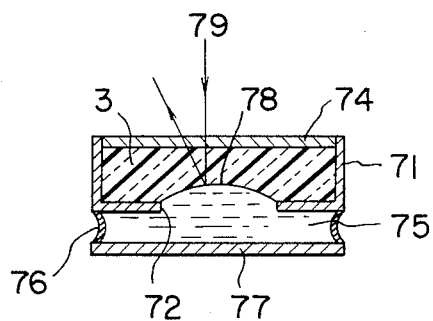
Figure 14:
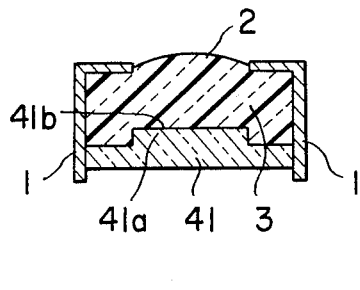

Each of FIGS. 25 and 26 shows an embodiment of such an optical device.

In these Figures, 71 is a cylindrical casing having a circular opening 72, 3 is a transparent elastic body, 74 is an optically transparent plate which is a movable member for pressurization of the elastic body, 75 is a reflective medium composed of mercury, 76 is an elastic member such as of rubber, and 77 is a reservoir for storing mercury. FIG. 25 shows a state when pressure is applied on the elastic body 3 through the movable member 74. In this case, depending on the magnitude of the pressure applied, a part 3a of the elastic body 3 is protruded out of the opening portion 72 in shape of a convex lens. At this point, the part 3a protruded in convexity is contacted with the mercury 75 to form a boundary face 78 between the elastic body 3 and the mercury 75. This boundary face 78 becomes a reflective surface with respect to the light flux 79 arriving through the elastic body 3. As the elastic body is pressurized, the protruded part 3a will push out the mercury 75 while changing the shape of the boundary face 78. The mercury is pushed out while deforming the elastic member 76 which can readily be deformed, and therefore the mercury will not interfere with protrusion of the elastic member 3 in the shape of a convex lens.

This reflective face 78 can be utilized as a concave mirror and by changing the magnitude of the pressure applied on the parallel plate 74, the amount of the elastic body protruded in convexity is changed to vary the curvature of the reflective face 78, thus providing a concave mirror with variable focus.

FIG. 26 shows a case in which a negative pressure is applied on the elastic body 3 by a flat plate 74 disposed in parallel with the opening. The elastic body 3 is drawn by the flat plate, whereby the elastic body 3 takes the shape of a concave lens at the opening 72. Also in this case, the mercury 75 forms a face 75 contacting the deformed elastic body 3, and the face 78 forms a convex mirror. By changing the magnitude of the negative pressure applied on the flat plate 74, the curvature of the convex mirror can be changed continuously.

In place of mercury for forming the reflective surface as described above, it is also possible to use other liquid substances capable of forming a reflective surface, such as a liquid dispersion formed by suspending fine aluminum powder in a liquid such as xylol. Further, in place of mercury, an elastic body capable of forming a reflective surface and being readily deformed, such as silicone rubber containing fine aluminum powder may be used.

The present invention will be explained more specifically hereinbelow by referring to actual examples of production and use of optical devices.

EXAMPLE 1

Figure 27:
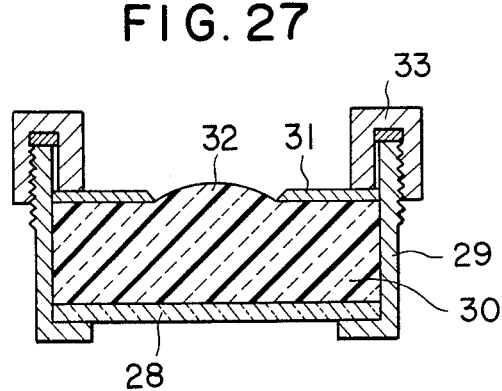
FIG. 27 is a sectional view of another embodiment of the optical device of the present invention.

An optical device having a sectional view as shown in FIG. 27 was prepared. First, into a cylindrical casing 29 (inner diameter 50 mm, depth 20 mm) made of brass having a transparent glass plate 28 at the bottom was charged a mixture prepared by adding 12 wt. % of a catalyst (trade name: Catalyst 104, produced by Shinetsu Kagaku Kogyo K.K.) to a silicone rubber (trade name: KE 104 Gel, produced by Shinetsu Kagaku Kogyo K.K.), which mixture was then left to stand at 50° C. for 48 hours, to provide a transparent elastic body 30. The transparent elastic body had an elasticity modulus of about $2 \times 10^5$ dyn/cm². Then, on the transparent elastic body 30 was placed an aluminum plate 31 having an opening 32 with a diameter of about 15 mm, which was pressed down by a pressing ring 33. The pressing ring 33 is constructed so that it can be screwed into the cylindrical casing 29, and the aluminum plate 31 can be moved vertically through rotation of the pressing rig 33 whereby the transparent elastic body can be protruded or recessed from the opening 32 of aluminum plate 31. The shape of the protruded or recessed portion is a rotationally symmetrical but non-spherical surface with greater radius of curvature near the optic axis and smaller radius of curvature at the peripheral portion. By varying the pressure applied by rotation of the pressing ring within the range of from 0 to 200 g/cm², the radius of curvature near the optical axis could be varied continuously within the range of $\infty$ to 30 mm.

In this case, the focal length of the lens could be varied within the range of from $\infty$ to 74 mm.

As will be understood, the combination of the casing 29 and the pressing ring 33 can also function as means for constantly applying a force to the elastic body and maintaining a constant shape of the exposed surface part of the elastic body formed through the deformation of the elastic body, if necessary, with the aid of an adhesive or welding.

EXAMPLE 2

When the diameter of the opening 32 of the aluminum plate 31 was changed to 10 mm in Example 1, the radius of curvature near the optical axis could be varied within the range of from $\infty$ to 23 mm and the focal length from $\infty$ to 57 mm under a pressure of 0 to 200 g/cm².

EXAMPLE 3

When the amount of the catalyst added was changed to 10% in Example 1, the transparent elastic body obtained had an elasticity modulus of about $1 \times 10^5$ dyn/cm². The radius of curvature near the optical axis could be changed within the range of from $\infty$ to 32 mm, and the focal length from $\infty$ to 79 mm under a pressure of 0 to 100 g/cm².

EXAMPLE 4

In Example 1, the surface of an aluminum plate 31 having an opening which was to contact an transparent elastic body 30 was coated previously with a primer (trade name: Primer A, produced by Shinetsu Kagaku Kogyo K.K.) and the aluminum plate 31 was bonded to the transparent elastic body 30. When a negative pressure was applied on the transparent elastic body by drawing up the aluminum plate 31 by rotation of the pressing ring 33, the transparent elastic body 30 at the opening 32 of the aluminum plate became recessed to form a concavity. The radius of curvature near the optical axis could be varied from $\infty$ to 63 mm and the focal length from $-\infty$ to $-155$ mm under a negative pressure applied of from 0 to 100 g/cm².

From this fact, by pushing down or drawing up an aluminum plate, the concavo-convex shaped lens can be formed continuously, and the lens was recognized to act as an optical device capable of varying in the focal length in the range of from $\infty$ to 74 mm $\rightleftarrows -\infty$ to $-155$ mm.

EXAMPLE 5

In Example 1, the silicone rubber as an elastic body was replaced with a reaction product of diethyleneglycol bisallylcarbonate (trade name: TS-16, produced by Tokuyama Soda K.K.) crosslinked with 3% of benzoyl peroxide at 80° C. for 90 minutes (in this case, TS-16 was considered to be a gel-like elastic body with good transparency containing 70 to 80% of the monomer dispersed in about 20 to 30% of a network polymer). As a result, a similar lens with variable focal length was obtained.

When diallyl phthalate or diallyl isophthalate is employed in place of diethyleneglycol bisallylcarbonate, a similar lens with variable focal length can be obtained.

EXAMPLE 6

Figure 28:
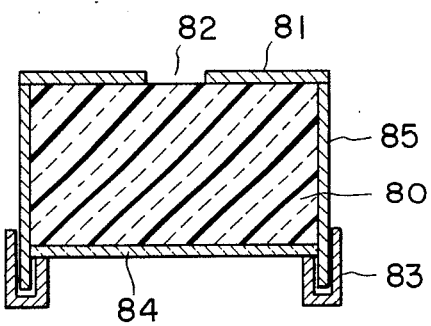
FIG. 28 is a sectional view of another embodiment of the optical device of the present invention with variable opening diameter.

An optical device having a sectional view as shown in FIG. 28 was prepared. First, into a cylindrical vessel 85 (inner diameter 50 mm, depth 20 mm) made of brass having a transparent glass plate 84 at the bottom was charged a mixture prepared by adding 12 wt. % of a catalyst (trade name: Catalyst 104, produced by Shinetsu Kagaku Kogyo K. K.) to a silicone rubber (trade name: KE 104 Gel, produced by Shinetsu Kagaku Kogyo K.K.), which was left to stand at 50° C. for 48 hours, to provide a transparent elastic body 80. The transparent elastic body had an elasticity modulus of about $2 \times 10^5$ dyn/cm². Then, on the surface of the transparent elastic body 80 was placed a member 81 having an iris mechanism variable in diameter from 5 to 20 mm. A glass plate 84 forming the bottom of the casing was made vertically movable by screwing the pressing ring 83 and the elastic body can be protruded or recessed at the opening 82. The shape of the protruded or recessed portion was rotationally symmetrical but non-spherical with a greater radius of curvature near the optical axis and a smaller radius of curvature at the peripheral portion. By applying a pressure of 200 g/cm² through rotation of the pressing ring 83 and varying the diameter at the opening portion within the range of from 5 mm to 20 mm, the radius of curvature near the optical axis could be varied continuously within the range of 11 mm to 30 mm. The focal length of the lens could be varied within the range of from 27 to 89 mm.

EXAMPLE 7

Figure 29:
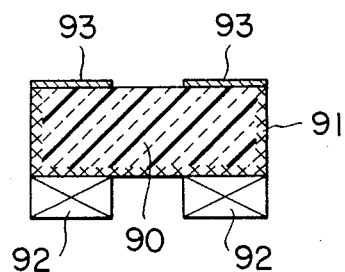
FIG. 29 and FIG. 30 each is a sectional view of another embodiment of the optical device the present invention, in which the surfaces of the elastic body except for one having an opening are hardened, FIG. 29 showing the state before applying an external force and Figure 30 showing a state when applying an external force.
Figure 30:
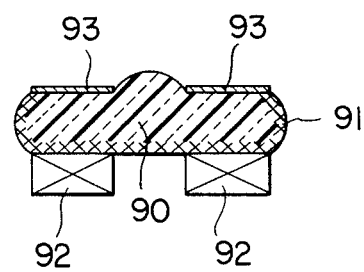

In preparation of the elastic body of silicone rubber (produced by Shinetsu Kagaku Kogyo K.K., trade name: KE 104 Gel), a catalyst (trade name: CAT-104, produced by Shinetsu Kagaku Kogyo K.K.) was first added in an amount of 1% to form an outside casing. Then, an elastic body containing 9% of the catalyst added was placed within the casing to prepare a composite elastic body 90 with a hardened peripheral portion 91 of a relatively hard elastic body (penetration of 30 as measured by ¼ inch consistometer according to JIS K 2808) and soft elastic body in the innerside (penetration of 80) as shown in FIG. 29. The elastic body 90 having the hardened peripheral portion 91 was combined with a member 93 having a circular opening made of a ferromagnetic material and an electromagnet 92. As a result, a very compact optical device could be obtained. FIG. 30 shows an appearance of the optical device when the elastic body was compressed with the electromagnet to have its optical surface protruded in a convex shape.

EXAMPLE 8

Figure 31:
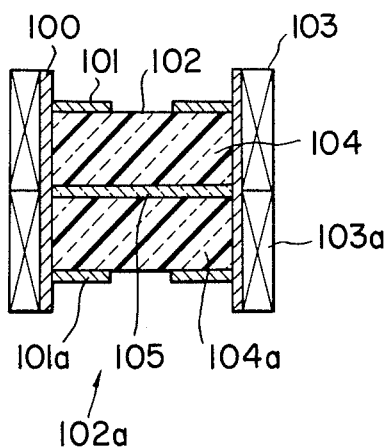
FIG. 31 is a sectional view of another embodiment of the optical device of the present invention, which is provided with a member for separating the elastic body.

FIG. 31 shows a sectional view of an optical device prepared in this Example. First, at the center in a cylindrical casing 100 (inner diameter 50 mm, depth 45 mm) made of brass, a glass plate 105 with a thickness of 1 mm was fixed as a separating member, and on the both sides thereof were charged a mixture of silicone rubber (trade name: KE 104 Gel, produced by Shinetsu Kagaku Kogyo K.K.) admixed with 12wt. % of a catalyst, which mixture was respectively left to stand at 50° C. for 48 hours, to provide transparent elastic bodies 104 and 104a. These elastic bodies had an elasticity modulus of $2 \times 10^5$ dym/cm$^2$. Then, on the elastic bodies 104 and 104a were placed and attached thereto respectively, iron plates 101 and 101a having openings 102 and 102a with diameters of 15 mm, the faces contacting the respective elastic bodies 104 and 104a of which had been previously applied with a primer (trade name: Primer A, produced by Shinetsu Kagaku Kogyo K.K.).

Two electromagnets 103 and 103a were arranged around the casing 100 and, by changing the current applied thereto, the pressures applied through the iron plates 101 and 101a were controlled independently, thereby variously changing the shapes of the silicone rubbers protruded out of the openings 102 and 102a. Under the state where no pressure was applied through the iron plates 101 and 101a, the distance between the surfaces 102 and 102a of the silicone rubber was about 15 mm. Also, even when a positive pressure was applied on one of the iron plates 101 and 101a and a negative pressure on the other iron plate, the distance between the top points of the silicone rubber surfaces 102 and 102a was substantially unchanged to form a meniscus lens.

When pressures of +20 g/cm$^2$ and +40 g/cm$^2$ were applied through the iron plate 101 by the electromagnet 103, the surface 102 of the silicone rubber became convex to have a radius of curvature near the optical axis of about 300 mm and about 150 mm, respectively, while application of a pressure of −20 g/cm$^2$ gave a concave face with radius of curvature near the optic axis of about 310 mm.

The surface 102a of the silicone rubber was similarly deformed when pressure was applied through the iron plate 101a.

Each of the refractive indices of the silicone rubbers 104, 104a and the glass plate 105 was found to be about 1.4, and therefore under the state where a pressure of +40 g/cm$^2$ was applied through each of the iron plates 101 and 101a at the same time, there was obtained a bi-convex lens with a focal length of about 190 mm; where +40 g/cm$^2$ through the iron plate 101 and −20 g/cm$^2$ through the plate 101a, a meniscus lens with a focal length of about 700 mm, and where −20 g/cm$^2$ through each of the iron plates 101 and 101a, a bi-concave lens with a focal length of about −370 mm.

On the other hand, under the state where a pressure of +20 g/cm$^2$ was applied through the iron plate 101 and a pressure of −20 g/cm$^2$ through the iron plate 101a (almost equivalent to a case where the iron plates 101 and 101a were fixed on the casing 100, and the glass plate 105 as a separating member was moved by a downward force so as to exert a pressure of 40 g/cm$^2$), a meniscus lens with a substantially infinite ($\infty$) focal length was obtained.

What is claimed is:

1. An optical device, comprising an elastomeric body and a relatively rigid member having an opening and contacting the elastomeric body to expose a part of the surface of the elastomeric body through the opening, the exposed surface part of the elastomeric body being changeable in shape so as to form a variable optical surface by release of volumetric stress of the elastomeric body through the exposed surface part.

2. An optical device according to claim 1, wherein said member having an opening is movable.

3. An optical device according to claim 1, wherein a movable member is provided on a side of the elastomeric body opposite to the member having an opening so that the elastomeric body is sandwiched between both members.

4. An optical device according to claim 1, further comprising a movable member disposed in contact with a face of the elastomeric body substantially perpendicular to the face of the elastomeric body having the exposed surface part.

5. An optical device according to claim 1, wherein the opening of said relatively rigid member retains its shape during the deformation of the elastomeric body.

6. An optical device according to claim 4, wherein the movable member is a piezoelectric element.

7. An optical device according to claim 6, wherein the piezoelectric element is cylindrical in shape.

8. An optical device according to claim 1, further comprising, on a side of the elastomeric body opposite to said member having an opening, another member having an opening capable of allowing formation of another optical surface on the elastomeric body, so that the elastomeric body is sandwiched between both the members having openings.

9. An optical device according to claim 1, wherein the elastomeric body has a modulus of elasticity of $10^8$ dyn/cm$^2$ or less.

10. An optical device according to claim 9, wherein the elastomeric body has a modulus of elasticity of $10^6$ dyn/cm$^2$ or less.

11. An optical device according to claim 1, which is provided with a member having a concave or convex face contacting the elastomeric body on the side opposite to the member having an opening so that the elastomeric body is sandwiched between both members.

12. An optical device according to claim 1, wherein the member having an opening is capable of changing the area and the shape of the opening.

13. An optical device according to claim 1, wherein all or a part of the surface except for the surface for forming the optical surface is hardened.

14. An optical device according to claim 1, wherein said elastomeric body is substantially transparent.

15. An optical device according to claim 1, wherein said opening is circular in shape.

16. An optical device according to claim 1, wherein said opening is rectangular in shape.

17. An optical device according to claim 2, wherein said member having an opening is made of a ferromagnetic material and moved by an electromagnet.

18. An optical device according to claim 3, wherein said movable member is made of a ferromagnetic material and moved by an electromagnet.

19. An optical device according to claim 1, wherein the member having an opening is capable of changing the area or the shape of the opening.

20. An optical device, comprising an elastomeric body having a reflective surface and a relatively rigid member having an opening and contacting the reflective surface of the elastomeric body so as to expose a part of the reflective surface of the elastomeric body through the opening, the exposed part of the reflective surface of the elastomeric body being changeable in shape so as to form a variable optical surface by release of volumetric stress of the elastomeric body through the exposed surface part.

21. An optical device, comprising plural layers of elastomeric bodies, a separating member interposed between an adjacent pair of said plural layers of elastomeric bodies, and a pair of relatively rigid members respectively having an opening and sandwiching the elastomeric bodies through the openings, the surfaces of the exposed parts of the elastomeric bodies being changeable independently from each other so as to form variable optical surfaces respectively separated by the separating member, by release of volumetric stress of each of the elastomeric bodies through the openings.

22. An optical device, comprising an elastomeric body, a relatively rigid member having an opening and contacting the elastomeric body to expose a part of the surface of the elastomeric body, and a medium having a reflective surface contacting the exposed surface part of the elastomeric body, said exposed surface part of the elastomeric body being changeable in shape by release of volumetric stress of the elastomeric body through the exposed surface part, and the reflective surface of the medium being changeable in shape corresponding to the deformation of the exposed surface part.

23. An optical device, comprising an elastomeric body, a relatively rigid member having an opening and contacting the elastomeric body to expose a part of the surface of the elastomeric body through the opening, and means for constantly applying a force to the elastomeric body and maintaining a constant shape of the exposed surface part of the elastomeric body formed by release of volumetric stress of the elastomeric body through the exposed surface part.

24. A method of varying focal length, which comprises:
providing an optical device comprising an elastomeric body and a relatively rigid member having an opening and contacting the elastomeric body to expose a part of the surface of the elastomeric body so that the exposed part will form an optical surface, and
including a volumetric stress in the elastic body, which is released through the exposed surface part so as to change the shape of the optical surface.

25. A method of varying focal length according to claim 24, wherein the elastomeric body is deformed by moving said relatively rigid member relative to the elastomeric body.

26. A method of varying focal length as claimed in claim 24, wherein the elastomeric body is deformed by moving a movable member disposed on a side of the elastomeric body opposite to the member having an opening.

27. A method of varying focal length as claimed in claim 24, wherein the elastomeric body is deformed by moving a movable member disposed on a face of the elastomeric body substantially perpendicular to the optical surface.

* * * * *

UNITED STATES PATENT AND TRADEMARK OFFICE
CERTIFICATE OF CORRECTION

PATENT NO. : 4,783,155
DATED : November 8, 1988
INVENTOR(S) : HIROYUKI IMATAKI, ET AL.

It is certified that error appears in the above-identified patent and that said Letters Patent is hereby corrected as shown below:

COLUMN 1

Line 11, "disc," should read --discs,--.

COLUMN 2

Line 1, "force ap-" should read --force is ap- --.
    Line 44, "device the" should read --device of the--.

COLUMN 3

Line 35, "(ey)" should read --(y)--.
    Line 48, "the of" should read --the degree of--.
    Line 49, "substance" should read --substances--.
    Line 65, "on the" should be deleted.

COLUMN 5

Line 16, "opening" should read --openings--.
    Line 32, "does" should be deleted.
    Line 38, "similarly" should read --similarity--.
    Line 39, "amount," should read --amount--.

COLUMN 8

Line 12, "opening 12" should read --opening 2--.

COLUMN 9

Line 3, "elastic both" should read --elastic body--.

COLUMN 10

Line 66, "face 75" should read face 78--.

UNITED STATES PATENT AND TRADEMARK OFFICE
CERTIFICATE OF CORRECTION

PATENT NO. : 4,783,155

DATED : November 8, 1988

INVENTOR(S) : HIROYUKI IMATAKI, ET AL.

It is certified that error appears in the above-identified patent and that said Letters Patent is hereby corrected as shown below:

COLUMN 11

Line 27, "$2 \times 10^5$ dyn/cm$^2$." should read --$2 \times 10^5$ dyne/cm$^2$.--.
    Line 34, "rig 33" should read --ring 33--.
    Line 56, "Example 1," should read --Example 2,--.
    Line 63, "Example 1," should read --Example 3,--.
    Line 65, "dyn/cm$^2$." should read --dyne/cm$^2$.--.

COLUMN 12

Line 3, "Example 1," should read --Example 4,--.
    Line 4, "an" (second occurrence) should read --a--.
    Line 25, "Example 1," should read --Example 5,--.
    Line 51, "$2 \times 10^5$ dyn/cm$^2$." should read --$2 \times 10^5$ dyne/cm$^2$.--.

COLUMN 13

Line 7, "1%" should read --14%--.
    Line 36, "$2 \times 10^5$ dyn/cm$^2$." should read --$2 \times 10^5$ dyne/cm$^2$.--.

COLUMN 14

Line 60, "dyn/cm$^2$" should read --dyne/cm$^2$--.
    Line 63, "dyn/cm$^2$" should read --dyne/cm$^2$--.

UNITED STATES PATENT AND TRADEMARK OFFICE
CERTIFICATE OF CORRECTION

PATENT NO. : 4,783,155
DATED : November 8, 1988
INVENTOR(S) : HIROYUKI IMATAKI, ET AL.

It is certified that error appears in the above-identified patent and that said Letters Patent is hereby corrected as shown below:

COLUMN 16

Line 27, "including" should read --inducing--.
Line 27, "elastic" should read --elastomeric--.

Signed and Sealed this

Twenty-seventh Day of June, 1989

Attest:

DONALD J. QUIGG

Attesting Officer

Commissioner of Patents and Trademarks